(12) United States Patent  
Pommeret et al.

(10) Patent No.: US 6,616,215 B2  
(45) Date of Patent: Sep. 9, 2003

(54) REAR QUARTER WITH SIGNALING LIGHTS

(75) Inventors: Maelig Pommeret, Oyonnax (FR); Charlotte Thevenet, Izernore (FR); Dominique Delavalle, Marchon (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 10/082,266

(22) Filed: Feb. 26, 2002

(65) Prior Publication Data

US 2002/0135203 A1 Sep. 26, 2002

(30) Foreign Application Priority Data

Feb. 26, 2001 (FR) ............................................. 01 02594

(51) Int. Cl.⁷ .................................. B60J 1/10; B60A 1/26
(52) U.S. Cl. .................. 296/146.15; 362/540; 362/541
(58) Field of Search ..................... 296/146.15; 362/497, 362/498, 499, 540, 541, 542

(56) References Cited

U.S. PATENT DOCUMENTS

| | | | | |
|---|---|---|---|---|
| 3,616,839 A | * | 11/1971 | Burrin et al. ............... | 428/429 |
| 3,652,328 A | * | 3/1972 | Dork et al. ................. | 428/335 |
| 3,895,859 A | * | 7/1975 | Yoshida et al. ......... | 296/146.15 |
| 4,332,413 A | * | 6/1982 | Erion ..................... | 296/146.15 |
| 4,488,141 A | * | 12/1984 | Ohlenforst et al. ........... | 340/97 |
| 4,494,326 A | * | 1/1985 | Kanamori ................... | 362/84 |
| 4,799,730 A | * | 1/1989 | Harasaki ..................... | 296/195 |
| D321,943 S | * | 11/1991 | Malmgren et al. ........... | D26/28 |
| D321,944 S | * | 11/1991 | Malmgren et al. ........... | D26/28 |
| D321,946 S | * | 11/1991 | Falck et al. ................... | D26/35 |
| D323,901 S | * | 2/1992 | Falck et al. ................... | D26/35 |
| 5,211,466 A | * | 5/1993 | Jarocki et al. ......... | 296/146.15 |
| 5,400,225 A | * | 3/1995 | Currie ......................... | 362/32 |
| 5,419,088 A | * | 5/1995 | Raymond et al. ................ | 52/1 |
| 5,831,523 A | * | 11/1998 | Lange ........................ | 340/479 |
| 5,915,780 A | * | 6/1999 | Kobrehel et al. ...... | 296/146.15 |
| 6,350,049 B1 | * | 2/2002 | Zimmermann et al. ..... | 362/542 |
| D459,508 S | * | 6/2002 | Horowitz ..................... | D26/28 |

FOREIGN PATENT DOCUMENTS

| | | |
|---|---|---|
| DE | 29 48 524 A1 | 6/1981 |
| DE | 0 403 334 A1 | 12/1990 |
| DE | 197 06 043 A1 | 6/1998 |
| DE | 197 07 614 A1 | 8/1998 |
| JP | 57-37012 * | 3/1982 ............ 296/146.15 |

OTHER PUBLICATIONS www.neci.nec.com/homepages/sandiway/personal/photos/japan/nov98/honda.crv.2.jpg.*
www.vhfcu.org/content/autosales/images/98-honda-crv.jpg.*
www.dailysouthtown.com/southtown/siegel/x21-sgl.htm.*

* cited by examiner

*Primary Examiner*—D. Glenn Dayoan  
*Assistant Examiner*—H. Gutman  
(74) *Attorney, Agent, or Firm*—Oliff & Berridge, PLC

(57) ABSTRACT

The invention relates to a piece of rear quarter bodywork (14) made as a single piece and comprising at least a portion made of translucent or transparent material that forms a quarter window (15). The piece of bodywork has another portion (17) contiguous with the quarter window (15) and forming glazing for lights suitable for protecting a light source that is located on the vehicle in the vicinity of the quarter window.

9 Claims, 4 Drawing Sheets coupe A-A

REAR QUARTER WITH SIGNALING LIGHTS

BACKGROUND OF THE INVENTION

1. Field of the Invention

The present invention relates to a rear quarter piece of bodywork.

2. Description of Related Art

In conventional cars, the roof of the vehicle is connected to the remainder of the bodywork via two front uprights on either side of the windshield and two rear uprights situated generally in line with rear edges of rear doors, or of front doors if the vehicle does not have any rear doors.

These two rear uprights do not always coincide with the rear corners of the vehicle, in which case there exists a solid or empty surface that is generally not structural and that is referred to as a rear "quarter" between each rear upright and the corresponding rear corner.

The rear quarter can be covered in a piece of opaque bodywork made of plastics material or of painted sheet metal. It can also include a window. This is referred to as a quarter window.

This portion of the vehicle is not generally used for receiving functional members such as signaling light units, for example, in particular because of the docking difficulties that would arise.

Juxtaposing a quarter window with an optical unit assumes accurate relative positioning, i.e. assembly clearances that are extremely tight together with manufacturing tolerances that are very small, which makes such configurations economically unacceptable.

In addition, the need to seal the passenger compartment and also the housing of the light unit would require the use of gaskets and mounting or assembly means that are relatively expensive.

At best, rear quarters are therefore used merely to provide an additional window increasing the field of view of the driver and of passengers, and also improving natural lighting inside the passenger compartment.

SUMMARY OF THE INVENTION

The present invention seeks to provide a solution to the above-mentioned problems for using the area occupied by a rear quarter for functional purposes.

The present invention provides a rear quarter piece of bodywork made as a single piece and comprising at least a portion of transparent or translucent material forming a quarter window, the piece being characterized in that it includes another portion contiguous with the quarter window and forming glazing for lights suitable for protecting a light source positioned on the vehicle in the vicinity of the quarter window.

In a particular embodiment of the invention, in addition to its portion forming a quarter window and its portion forming glazing for lights, the piece of bodywork also includes a third portion constituting a bodywork portion contiguous with the quarter window and having the same appearance as the remainder of the bodywork of the vehicle. In the description below, this portion is generally referred to as the "bodywork" portion.

As a general rule, the bodywork portion has the same color as the remainder of the body.

In a first embodiment of the invention, the piece of bodywork is made of a single transparent or translucent material suitable for constituting the quarter window and the portion forming glazing for lights, and possibly also the bodywork portion after being subjected to treatment seeking to modify its external appearance.

Such treatment can be overmolding film, painting, or silkscreen printing.

These treatments are not mutually exclusive. In particular, silkscreen printing can be used to modify the surface state of the piece of bodywork in order to make paint adhere better.

When part of the piece is painted, the invention presents the advantage that the paint can be applied on the inside face of the piece of bodywork, with the paint thus being fully protected from outside mechanical aggression.

Similarly, the portion of the piece of bodywork that forms glazing for lights can be covered in a colored varnish or an overmolded film providing local coloring for the glazing-forming portion, and this varnish or overmolded film can be placed on the inside face of the piece of bodywork, adjacent to the passenger compartment.

It will be understood that the invention makes it easier to solve problems of ensuring that the various elements combined in the rear quarter space are properly positioned relative to one another.

In a particular embodiment of the invention, the piece is made of polymethylmethacrylate (PMMA).

In a particular embodiment of the invention, trimming is associated with the piece of bodywork in order to be interposed between the vehicle and the piece of bodywork and to serve as a support for the piece of bodywork, while simultaneously constituting a light unit housing.

This trimming serves both a structural function, guaranteeing that the piece of bodywork is held and properly positioned on the vehicle, and an organic function in the sense that together with the piece of bodywork it forms a lighting or signaling unit.

In a particular embodiment of the invention, the portion of the piece of bodywork that constitutes the quarter window is itself subdivided into a fixed portion and a special portion forming an opening window, a fuel tank filler hatch, or having ventilation slots.

BRIEF DESCRIPTION OF DRAWINGS

In order to make the invention easy to understand, there follows a description of embodiments given as non-limiting examples of the scope of the invention, described with the help of the accompanying drawings, in which.

DETAILED DESCRIPTION OF PREFERRED EMBODIMENTS

Figure 1:
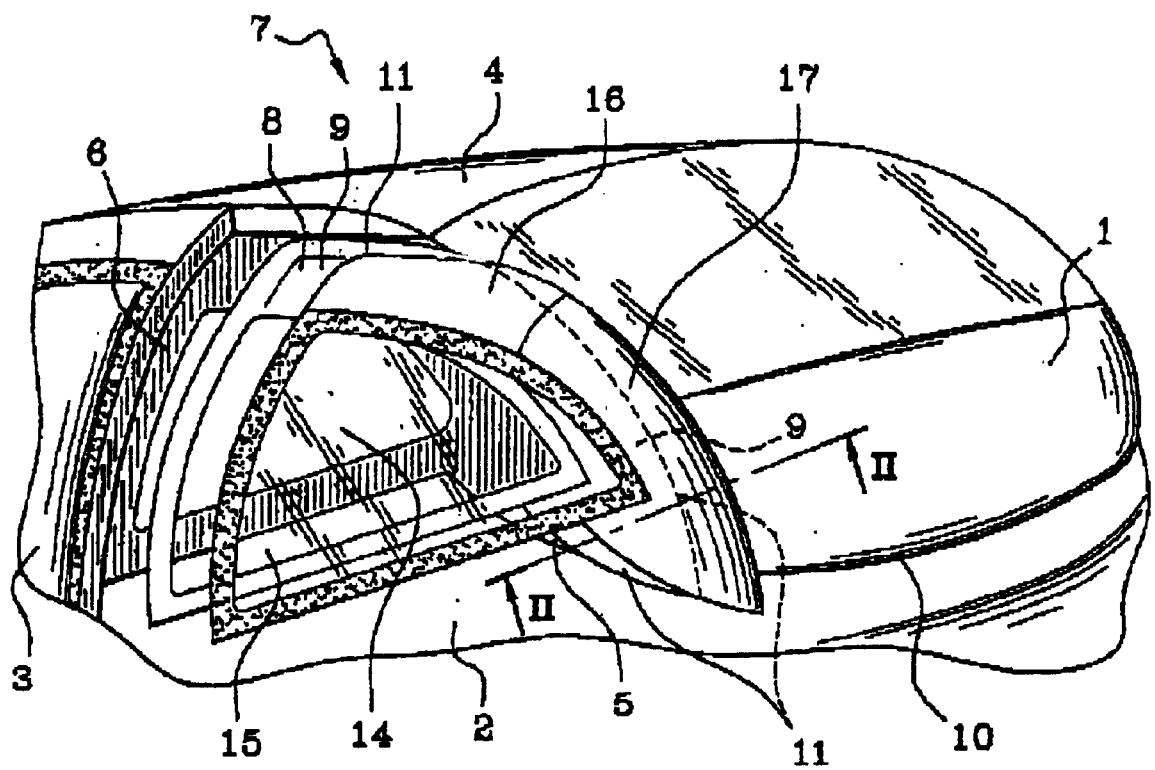
FIG. 1 is an exploded three-quarter rear perspective view of the top portion of a motor vehicle.
Figure 2:
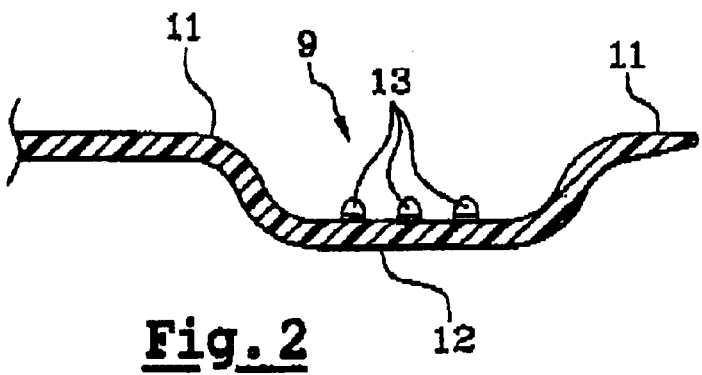
FIG. 2 is a section on II—II through a portion of trimming in FIG. 1.
Figure 3:
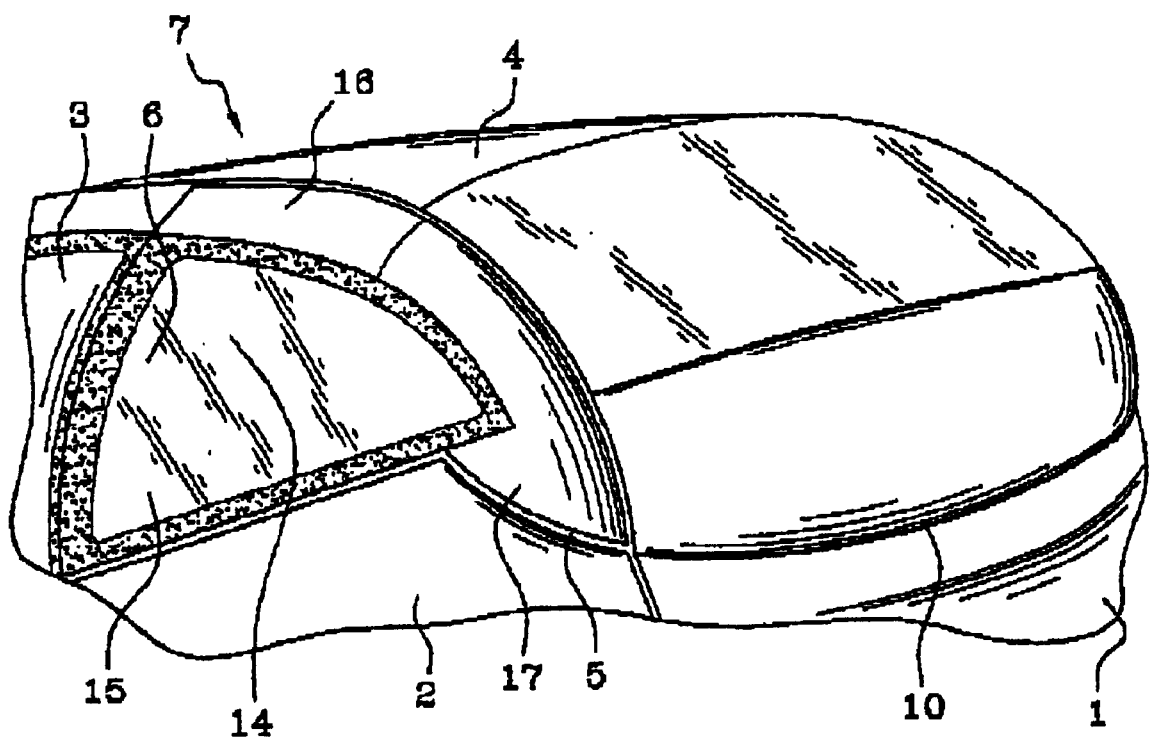
FIG. 3 is a view analogous to FIG. 1, with the elements being shown assembled together.

FIG. 1 shows a tailgate 1, a rear fender 2, a rear door 3, and a roof 4 of a motor vehicle. The top rear corner 5 of the fender is truncated for reasons of appearance.

The roof 4 is connected by means of a vertical upright 6 bordering the door 3 and situated in front of the rear corner 7 of the vehicle. Between the vertical upright 6 and the rear corner 7, the roof 4 and the fender 2 define a surface corresponding to a rear quarter. In the example shown, this quarter is substantially triangular.

A first piece 8 referred to as trimming and shaped to match the outlines of the rear quarter is designed to be fixed on the vertical upright 6, on the edge of the roof 4, on the framing of the tailgate 1, and on the top edge of the fender 2 using any fixing means that serve simultaneously to provide sealing for the connection between the trimming and the vehicle. This can be continuous adhesive or spot fastenings associated with a sealing gasket.

At the margin of the vertical upright 6 and the fender 2, the trimming forms no more than a frame.

In contrast, beside the roof 4 and the tailgate 1, it has an enlarged edge 9 which extends further down than the top edge of the fender 2 and forms a projection occupying the truncated corner 5 of the fender. The purpose of this particular configuration is merely to extend a style line 10 that runs transversely relative to the tailgate 1.

The enlarged edge 9 of the trimming is defined by rims 11 with an outside face level with the remainder of the trimming, and includes a bottom 12 that is set back and co-operates with said rims to constitute a housing that is open towards the outside of the vehicle. The bottom is provided with sockets for light sources such as light-emitting diodes (LEDs) 13 in its portion that extends between the top edge of the window in the tailgate 1 and the style line 10.

Because of the presence of this optical housing, the first piece 8 can be considered as constituting a functional part.

A piece of bodywork 14 having the same outline as the first piece 8 is made of transparent plastics material, e.g. of polymethylmethacrylate (PMMA) and is pressed against the trimming. It is secured for example by adhesive or by any other suitable leaktight fastening means.

The piece of bodywork 14 presents:

a transparent surface constituting a rear quarter window 15 over the opening defined by the of the trimming;

a portion of bodywork 16 having the same color as the remainder of the bodywork, in register with the enlarged edge portion of the trimming adjacent to the roof; and a piece of red colored glazing for lights 17 over the portion of the enlarged edge of the fitting that is provided with the sockets.

Each of the portions of the piece of bodywork is defined by a black finishing strip.

As a support for the piece of bodywork 14, the first piece 8 can be considered as constituting a structural piece.

The optical unit integrated in the rear quarter by means of the housing and the portion of glazing for lights 17 can be used in particular for signaling lights, stop lights, direction indicators.

It is advantageous to observe that because of the invention the glazing of the optical unit is constituted by the same piece as the rear quarter window, such that no problem of sealing can arise between these two pieces. In addition, the appearance of the finish is greatly improved because there is no docking clearance or expansion clearance between the light unit housing and the rear quarter window. The same advantage is obtained between the bodywork portion and the other two portions of the rear quarter.

Apart from the light signaling function, other functions can be integrated in the rear quarter.

Figure 4:
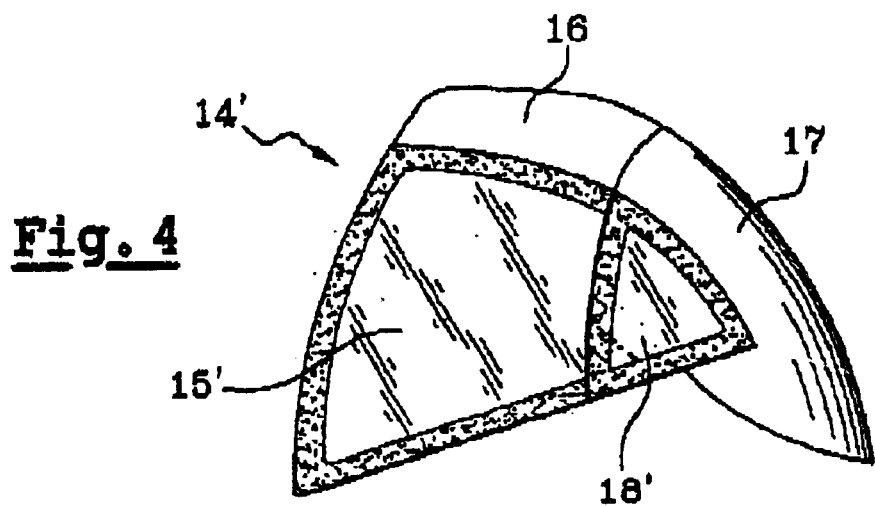
FIG. 4 shows a first variant of the bodywork piece.
Figure 5:
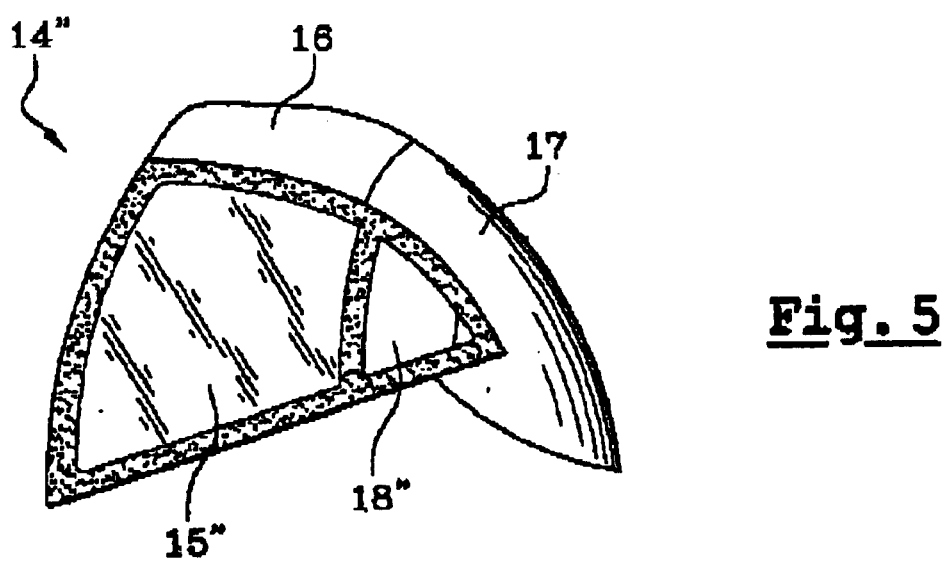
FIG. 5 shows a second variant of the bodywork piece.
Figure 6:
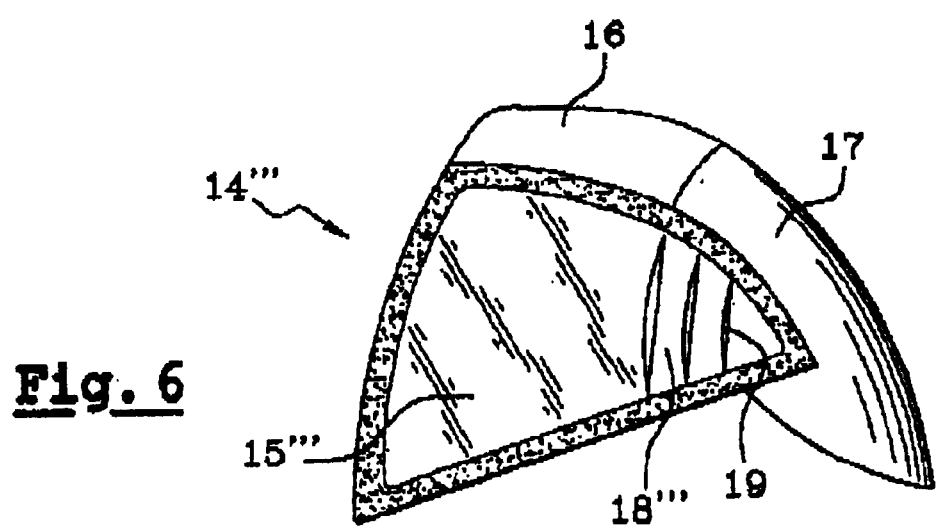
FIG. 6 shows a third variant of the bodywork piece.

FIGS. 4, 5, and 6 give various examples, in which the window portions of the rear quarter 15', 15", and 15'" of the piece of bodywork 14', 14", 14'" is subdivided into two in line with the separation between the bodywork portion and the light glazing portion.

In FIG. 4, a small subportion 18' of the window portion of the rear quarter forms an opening window.

In FIG. 5, the small subportion 18" of the window portion of the rear quarter forms a fuel tank filler hatch.

In FIG. 6, the small subportion 18'" has ventilation slots 19.

In this example, the ventilation slots allow air to circulate between the passenger compartment of the vehicle and the outside. Nevertheless, it should be observed that this air circulation does not apply to the optical unit housing which remains isolated both from the outside and from the inside in leaktight manner.

Figure 7:
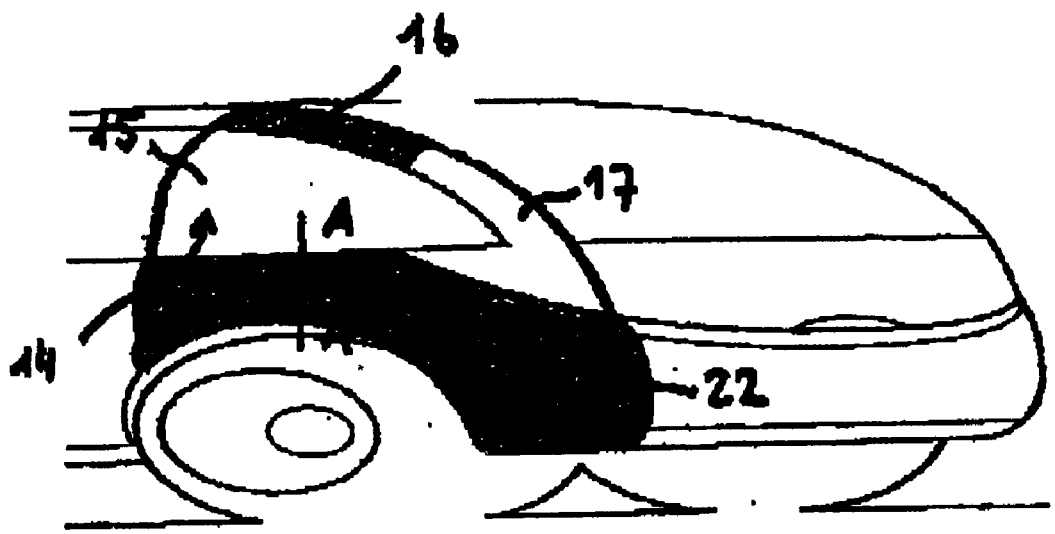
FIG. 7 shows a fourth variant of the bodywork piece assembled on the rear portion of a motor vehicle.

In the embodiment shown in FIG. 7, the piece of bodywork 14 comprises not only the rear quarter 15, the bodywork portion and the portion of glazing for lights 17, but also a second bodywork portion 22 having the same color as the remainder of the bodywork and contiguous with the rear quarter window, and more precisely situated to extend the rear quarter 15 and the portion of glazing for lights 17 downwards so as to form a portion of the fender 2 of the motor vehicle. This second bodywork portion 22 goes down as far as the wheel arch.

Figure 8:
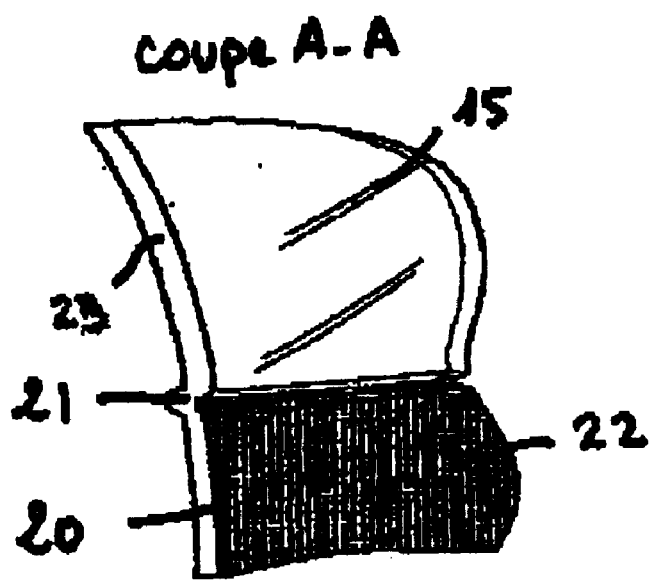
FIG. 8 is a perspective view showing the bodywork piece of FIG. 7 in section on axis A—A.

FIG. 8 is a section on axis A—A of FIG. 7, showing a detail of the piece of bodywork 14 that includes the rear quarter window 15 and the second bodywork portion 22.

As can be seen in this section, the piece of bodywork 14 is made of a single material 23 that is transparent or translucent. The second bodywork portion 22 is subjected to treatment that changes its outside appearance, which treatment can be implemented in the form of an overmolded opaque film 20, paint, or silkscreen printing, as for the bodywork 16.

In addition, a finish-separating groove 21 is formed in the outside surface of the piece of bodywork 14 so as to define a boundary between the rear quarter window 15 and the second bodywork portion 22.

It should also be observed that the invention provides a significant reduction in the time required for assembly on the main assembly line because the rear quarter can be prepared off the main assembly line and can be fitted to the vehicle in a single operation.

Another advantage provided by the invention consists in the possibility of fitting different rear quarters from one vehicle to the next, as a function of selected options or equipment levels.

Finally, the invention makes it possible to reduce the number of components needed for installing the various functions that are to be performed, thereby achieving a saving in terms of cost price.

The examples described above should not be considered as being limiting on the scope of the invention which is defined solely by the accompanying claims.

What is claimed is:

1. A rear quarter piece of bodywork made as a single piece comprising at least a portion of transparent or translucent material forming a quarter window and another portion continuous with the quarter window and forming glazing for light suitable for protecting a light source, positioned in the vicinity of the quarter window.

2. A rear quarter piece of bodywork according to claim 1, further comprising a third portion constituting a bodywork portion contiguous with the quarter window and having the same appearance as the remainder of the bodywork of a vehicle.

3. A rear quarter piece of bodywork according to claim 1, further comprising a third portion constituting a bodywork portion contiguous with the quarter window and having the same appearance as the remainder of the bodywork of a vehicle, made of the single transparent or translucent material after being subjected to treatment seeking to modify an external appearance.

4. A piece of rear quarter bodywork according to claim 1, further comprising a third portion constituting a bodywork portion contiguous with the quarter window and having the same appearance as the remainder of the bodywork of a vehicle, made of the single transparent or translucent material after being covered by an overmolded film, painted or silk-screened printed to modify an external appearance.

5. A piece of rear quarter bodywork according to claim 1, further comprising a third portion constituting a bodywork portion contiguous with the quarter window and having the same appearance as the remainder of the bodywork of a vehicle, made of the single transparent or translucent material after being painted on an inside face of the piece of bodywork.

6. A piece of rear quarter bodywork according to claim 1, further comprising a third portion constituting a bodywork portion contiguous with the quarter window and having the same appearance as the remainder of the bodywork of a vehicle, made of the single transparent or translucent material after being covered in a colored varnish or in an overmolded film placed on an inside face of the piece of bodywork.

7. A piece of rear quarter bodywork according to claim 1, made of polymethylmethacrylate (PMMA).

8. A piece of rear quarter bodywork according to claim 1, wherein trimming is associated with the piece of bodywork to be interposed between a vehicle and the piece of bodywork and to serve as a support for the piece of bodywork, while simultaneously constituting a light unit housing.

9. A piece of rear quarter bodywork according to claim 1, wherein the portion of the piece of bodywork that constitutes the quarter window is subdivided into a fixed portion forming an opening window, a fuel tank filler hatch, or having ventilation slots.

* * * * *

UNITED STATES PATENT AND TRADEMARK OFFICE
CERTIFICATE OF CORRECTION

PATENT NO.     : 6,616,215 B2
DATED          : September 9, 2003
INVENTOR(S)    : Maelig Pommeret et al.

It is certified that error appears in the above-identified patent and that said Letters Patent is hereby corrected as shown below:

<u>Title page,</u>
Item [73], Assignee, should read -- [73] Assignee: Compagnie Plastic Omnium, Lyon (FR) --

Signed and Sealed this

Seventeenth Day of February, 2004

JON W. DUDAS
*Acting Director of the United States Patent and Trademark Office*